US011524655B2

(12) United States Patent
Kelly (10) Patent No.: US 11,524,655 B2
(45) Date of Patent: Dec. 13, 2022

(54) METHOD AND SYSTEM FOR RELAY ATTACK PREVENTION INCORPORATING VECTOR CHECK (71) Applicant: ROBERT BOSCH (AUSTRALIA) PTY LTD, Clayton (AU)

(72) Inventor: Matthew Kelly, Victoria (AU)

(73) Assignee: ROBERT BOSCH (AUSTRALIA) PTY LTD, Victoria (AU)

(*) Notice: Subject to any disclaimer, the term of this patent is extended or adjusted under 35 U.S.C. 154(b) by 330 days.

(21) Appl. No.: 16/765,127

(22) PCT Filed: Nov. 20, 2018

(86) PCT No.: PCT/AU2018/051241
§ 371 (c)(1),
(2) Date: May 18, 2020

(87) PCT Pub. No.: WO2019/095021
PCT Pub. Date: May 23, 2019

(65) Prior Publication Data
US 2020/0346616 A1 Nov. 5, 2020

(30) Foreign Application Priority Data
Nov. 20, 2017 (AU) ................................ 2017904686

(51) Int. Cl.
*B60R 25/20* (2013.01)
*H04B 17/318* (2015.01)
(Continued)

(52) U.S. Cl.
CPC ........ *B60R 25/2072* (2013.01); *B60R 25/245* (2013.01); *H01Q 1/3241* (2013.01);
(Continued)

(58) Field of Classification Search
CPC ... B60R 25/2072; B60R 25/245; B60R 25/30; B60R 25/24; B60R 2325/103;
(Continued)

(56) References Cited

U.S. PATENT DOCUMENTS

| 9,963,109 | B2 * | 5/2018 | Luo | B60R 25/245 |
|---|---|---|---|---|
| 2011/0148573 | A1 * | 6/2011 | Ghabra | H04B 17/24 340/5.72 |
| 2013/0069760 | A1 | 3/2013 | Lickfelt | |
| 2015/0004917 | A1 * | 1/2015 | Juzswik | H04B 17/21 455/67.13 |

FOREIGN PATENT DOCUMENTS

GB 2471163 A 12/2010

OTHER PUBLICATIONS

Feteiha, Mohamed F., Mahmoud H. Qutqut, and Hossam S. Hassanein. "Pairwise error probability evaluation of cooperative mobile femtocells." 2013 IEEE Global Communications Conference (GLOBECOM). IEEE, 2013. (Year: 2013).*
(Continued)

*Primary Examiner* — Sharad Rampuria
(74) *Attorney, Agent, or Firm* — Norton Rose Fulbright US LLP (57) ABSTRACT

A method and system for detecting if a relay is present in a PEPS system for a vehicle is provided which includes (a) transmitting LF signals from antennas associated with a vehicle to a key fob using a 3D LF receiver to measure the LF signal level on the x, y and z-axes; (b) selecting two or more parallel antennas associated with the vehicle that are orthogonal to the antenna at the PEPS triggering location; (c) normalizing the x, y and z vectors that are measured by the key fob for the selected two or more parallel antennas associated with the vehicle; and (d) determining if the normalized x, y and z vectors for the selected two or more parallel antennas associated with the vehicle are within a predefined range.

8 Claims, 6 Drawing Sheets

(51) Int. Cl.
  *B60R 25/24* (2013.01)
  *H01Q 1/32* (2006.01)
  *H04W 12/122* (2021.01)
  *H04W 12/64* (2021.01)

(52) U.S. Cl.
  CPC ........ *H04B 17/318* (2015.01); *H04W 12/122* (2021.01); *H04W 12/64* (2021.01)

(58) Field of Classification Search
  CPC ...... H01Q 1/3241; H01Q 1/27; H04B 17/318; H04B 17/40; H04W 12/122; H04W 12/64; H04W 12/104; H04W 4/022; G06F 21/35; G06F 21/00; G01S 13/82
  See application file for complete search history.

(56) References Cited

OTHER PUBLICATIONS

Razmjouei, Pouyan, et al. "Ultra-lightweight mutual authentication in the vehicle based on smart contract blockchain: Case of MITM attack." IEEE Sensors Journal 21.14 (2020): 15839-15848. (Year: 2020).*
International Search Report for PCT/AU2018/051241, dated Feb. 4, 2019.
International Preliminary Report on Patentability for PCT/AU2018/051241, dated Mar. 20, 2020.

* cited by examiner

METHOD AND SYSTEM FOR RELAY ATTACK PREVENTION INCORPORATING VECTOR CHECK

FIELD OF THE INVENTION

The present invention relates to passive entry passive start (PEPS) systems and in particular, detection and/or prevention of relay attacks on PEPS systems in vehicles used to enter and/or start to the vehicle.

BACKGROUND INFORMATION

PEPS systems allow authorized users (with a valid key fob) to lock/unlock and start their vehicle without having to interact with the remote control (i.e. authorized key fob). The PEPS system may unlock or start the vehicle via a manually triggered input request (capacitive sensor, push button, etc.) if the key fob is determined to be in a valid PEPS zone.

A typical PEPS system defines operating regions such that if an authorized key fob is located within the correct operating region then the vehicle will respond to lock/unlock and start requests. PEPS regions can be defined by low frequency (LF) signal fields emitted from antennas on the vehicle. A received signal strength indicator (RSSI) is typically implemented in the authorized key fob as an abstraction of the magnetic field strength. The PEPS system may define the external operating regions and internal operating regions using the RSSI signal levels from the various antennas on the vehicle. If an authorized key fob is located within the correct regions, i.e., the RSSI levels correspond to a defined zone then the vehicle will respond to lock/unlock and start requests.

A problem associated with PEPS systems is that vehicle thieves may utilize what is known as a "relay attack" to steal the vehicle. The relay attack tricks the PEPS system into believing that the thief is an authorized user (in a defined operating region).

A relay attack generally requires two thieves ("Thief A" and "Thief B") together with the authorized user (i.e. vehicle owner or other possessor of the key fob) being the same vicinity. A relay attack involves extending the range of the LF field so that an authorized key fob which is not in proximity of the vehicle will receive the LF challenge signal. "Thief A" carries a relay receiver (to receive the LF signal) and is located close to the vehicle while "Thief B" carries a relay transmitter (to re-transmit the LF signal) and is located in close proximity to the authorized key fob. In an "analog relay", the relay receiver receives the LF signal then up-converts the frequency to a radio frequency (RF) and transmits it over an RF link to the relay transmitter. The relay transmitter receives the RF signal and the down-converts the RF signal to LF and re-transmits the LF signal to an authorized key fob. Analog relays are independent of the modulation and encoding of the LF signal. Other relay configurations are possible, for example, a "digital relay" where the relay receiver demodulates the LF signal and then the data stream is modulated over RF and transmitted. The relay transmitter demodulates the RF signal and then the data stream is modulated over LF and re-transmitted. In addition, relays are typically configured in what is known as a one dimensional (1D) relay which consist of a single antenna in both the relay receiver and relay transmitter and a single RF link. However, relays with additional antennas and RF links are also possible.

A key fob automatically transmits an RF response upon receiving the LF challenge. The RF response signal will typically transmit between approximately 20-200 m back to the vehicle. If the vehicle receives this response then it will assume that the key fob is in the vicinity of the vehicle and so the request will be authenticated. In addition, the relay attack method may also be applied to extend the range of the RF response range beyond the transmit range of the key fob.

In summary, in a relay attack, thieves are able to enter and start a vehicle when the key fob is outside its normal operating area by relaying messages from one location to another to make the vehicle appear closer to the key fob.

Techniques exist which aim to prevent relay attack by analysis of the PEPS LF and UHF signals, for example, measuring the time of flight, signal vector checks and/or signal superposition, etc. These techniques are generally complicated, ineffective or expensive.

Patent document GB2471163 discusses a relay attack countermeasure for a PEPS system where the vector components between two perpendicular antennas is performed. The countermeasure disclosed in GB2471163 relies on analysing the measured magnetic field vector components of two perpendicular vehicle antennas in a PEPS system. The vector components are compared to determine whether a relay attack is occurring on the PEPS system.

A problem with this approach is that comparing perpendicular antennas does not work when used in a typical relay attack situation since this arrangement is inhibited by the limited dynamic range of the RSSI measurement.

Before turning to a summary of the present invention, it will be appreciated that the discussion of the background to the invention is included to explain the context of the invention. This is not to be taken as an admission that any of the material referred to is published, known or part of the common general knowledge.

SUMMARY OF THE INVENTION

According to a first aspect, the present invention provides, a method of detecting if a relay is present in a PEPS system for a vehicle including the steps of: (a) transmitting LF signals from antennas associated with a vehicle to a key fob using a three dimensional (3D) LF receiver to measure the LF signal level on the x, y and z-axes; (b) selecting two or more parallel antennas associated with the vehicle that are orthogonal to the antenna at a PEPS triggering location; (c) normalizing the x, y and z vectors that are measured by the key fob for the selected two or more parallel antennas associated with the vehicle; and (d) determining if the normalized x, y and z vectors for the selected two or more parallel antennas associated with the vehicle are within a predefined range.

It will be appreciated that the normalized values for x, y and z are found by dividing the magnetic field value from x, y and z by the maximum value from x, y and z for each antenna transmission.

Step (a) may include transmitting signal the antennas associated with a vehicle to a key fob using with a 3D LF receiver and three LF antennas oriented in three different axes.

The LF challenge signal the challenge signal may contain a data telegram and sequentially transmitted CWs signal from the vehicle antennas.

The predefined range of the normalized values from the two or more antennas is required due to system inaccuracies. The required range may be determined experimentally to avoid false relay detections at the vehicle without compromising on the methods capability to detect a relay.

The signal may be transmitted as a low frequency LF signal.

According to a second aspect, the present invention provides, a system for detecting if a relay is present in a PEPS system for a vehicle including: antennas associated with a vehicle and a key fob using a 3D LF receiver to measure the LF signal level on the x, y and z-axes, and one or more controllers configured to: (a) transmit LF signals from the antennas associated with the vehicle to be measured by the key fob having using a three dimensional (3D) LF receiver; (b) select two or more parallel antennas associated with the vehicle that are orthogonal to the antenna at a PEPS triggering location; (c) normalize the x, y and z vectors that are measured by the key fob for the selected two or more parallel antennas associated with the vehicle; and (d) determine if the normalized x, y and z vectors for the selected two or more parallel antennas associated with the vehicle are within a predefined range.

It will be appreciated that a controller can be located in the vehicle only or in both the vehicle and key fob.

The vehicle may typically have two or more parallel antennas as well as an antenna orthogonal to the parallel antennas at the PEPS triggering location.

However, it will be appreciated that it may not necessary to select two or more parallel antennas associated with the vehicle that are orthogonal to the antenna at a PEPS triggering location. The selection of orthogonal antennas in the first and second aspects, are utilized because they are likely to couple low magnetic field levels into a relay. However, it is also possible to select other antenna orientations.

According to a third aspect, the present invention provides, a method of detecting if a relay is present in a PEPS system for a vehicle including the steps of: (a) transmitting LF signals from antennas associated with a vehicle to a key fob using a three dimensional (3D) LF receiver to measure the LF signal level on the x, y and z-axes; (b) selecting two or more antennas associated with the vehicle such that when a one dimensional relay is used the RSSI levels measured for the selected antennas by the key fob at the relay transmitter location occur in a 'noise floor' portion of an RSSI vs magnetic field curve associated with the 3D LF receiver; (c) normalizing the x, y and z vectors that are measured by the key fob for the selected antennas associated with the vehicle; and (d) determining if the normalized x, y and z vectors for the selected antennas associated with the vehicle are within a predefined range.

Advantageously, it need not be necessary to select two or more parallel antennas associated with the vehicle that are orthogonal to the antenna at a PEPS triggering location. Rather, the selected antennas must produce RSSI measurement levels that occur in the 'noise floor' part of an RSSI vs magnetic field curve of the 3D LF receiver in order for the vector check method to be effective.

According to a fourth aspect, the present invention provides, a system for detecting if a relay is present in a PEPS system for a vehicle including: antennas associated with a vehicle and a key fob using a 3D LF receiver to measure the LF signal level on the x, y and z-axes, and one or more controllers configured to: (a) transmit LF signals from the antennas associated with the vehicle to be measured by the key fob having using a three dimensional (3D) LF receiver; (b) selecting two or more antennas associated with the vehicle such that when a one dimensional relay is used the RSSI levels measured for the selected antennas by the key fob at the relay transmitter location occur in a 'noise floor' portion of an RSSI vs magnetic field curve associated with the 3D LF receiver; (c) normalize the x, y and z vectors that are measured by the key fob for the selected antennas associated with the vehicle; and (d) determine if the normalized x, y and z vectors for the selected antennas associated with the vehicle are within a predefined range.

DETAILED DESCRIPTION

Figure 1:
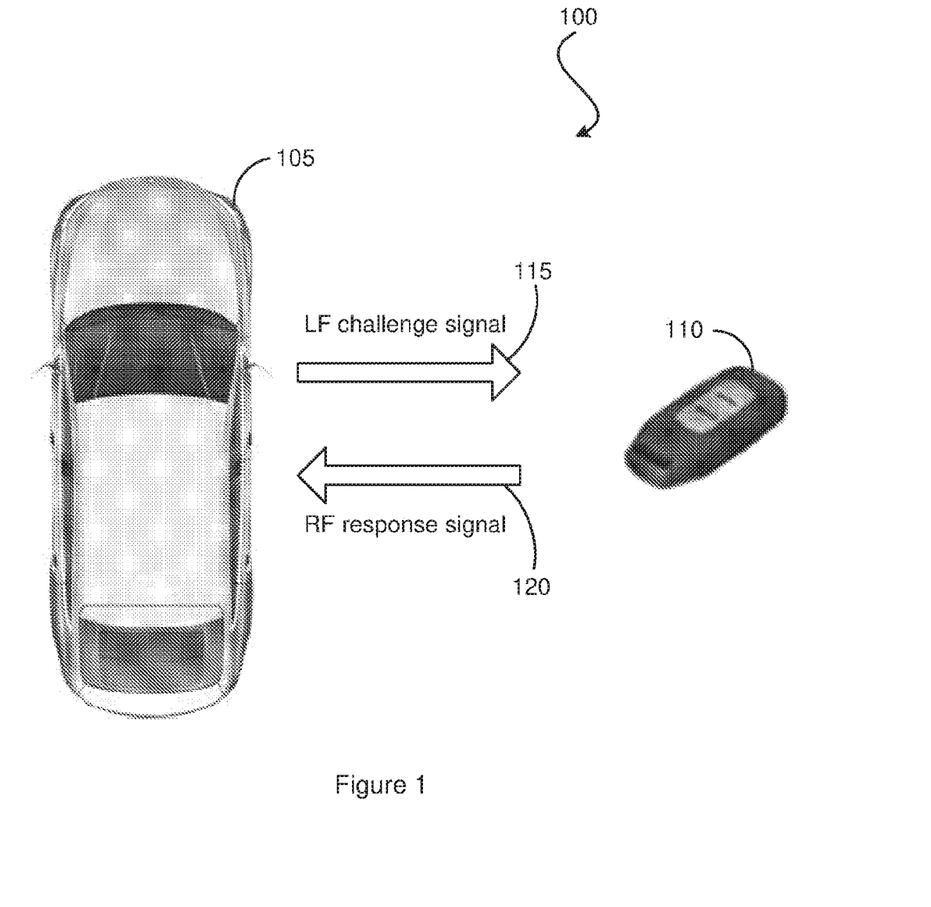
FIG. 1 is a schematic diagram illustrating a PEPS system.

FIG. 1 is a schematic diagram illustrating a vehicle PEPS system 100. The PEPS system 100 allows a vehicle owner (or possessor of the key fob) to lock/unlock and start a vehicle 105 without having to interact with the key fob 110. Typical PEPS systems define external operating regions and internal operating regions. If a key fob 110 is located within an operating region then the vehicle 105 will perform PEPS lock/unlock and start requests.

The PEPS operating regions may be defined by low frequency (LF) signal magnetic fields emitted from antennas on the vehicle. Received signal strength indicator (RSSI) can be utilized in the key fob and the PEPS system may define the external operating regions and internal operating regions using the RSSI signal levels measured from the various antennas on the vehicle 105. Then, if a key fob 110 is located within the correct regions (i.e. the RSSI levels correspond to a defined zone) then the vehicle 105 will perform the lock/unlock and start request.

PEPS systems may be configured to have a manually triggered unlock and start request (such as a capacitive sensor, push button and the like provided for example on the handle of the vehicle, or in the vehicle Start/Stop 105) to transmit the LF challenge signal 115 to the key fob 110. As part of the LF challenge signal 115, signals are transmitted from several (or all) of the vehicles antennas. If a key fob 110 is located within the expected operating regions (based on the RSSI values measured from the vehicle antennas), after receiving the LF challenge signal 115 it will transmit an authentication response signal on a radio frequency (RF) 120 allowing the request to be processed. It will be appreciated that bi-directional RF communication may also be used.

Some PEPS systems also provide permanent periodically transmitted LF challenge signals 115 prior to the manually triggered unlock request. For these systems, the vehicle knows when the key fob 110 is in the vicinity of the vehicle before an unlock request is made. The advantage of this is that it can improve system response times and provide additional features such as comfort lighting as the owner approaches the vehicle 105.

Figure 2:
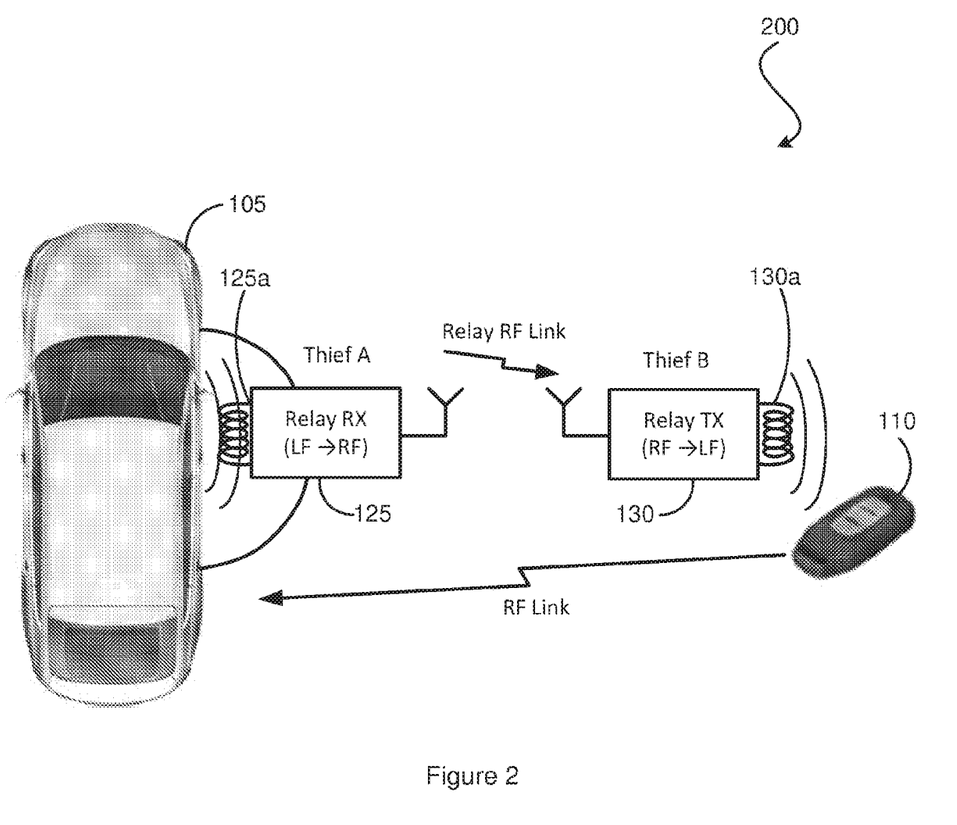
FIG. 2 is a schematic diagram illustrating a relay attack on a vehicle having a PEPS system.

As shown in the FIG. 2, the PEPS system 200 is vulnerable to theft due to what is known as "relay attack". The present invention attempts to prevent a relay attack from being successful. In FIG. 2, the relay attack involves extending the range of the LF field (shown in FIG. 1) so that a key fob 110 which is not in proximity of the vehicle 105 will receive the LF challenge signal. The relay attack requires two thieves, Thief A and Thief B where Thief A carries a relay receiver (Relay RX) 125 and is located close to the vehicle 105 while Thief B carries a relay transmitter (Relay TX) 130 and is located close to the key fob 110.

Relay RX 125 receives an LF signal from vehicle 105 and then up-converts the frequency to an RF frequency and transmits it via an RF link to Relay TX 130. Relay TX 130 receives the RF signal and then down-converts the frequency to LF and re-transmits the LF signal to the key fob 110. This scenario describes the previously defined "analog relay", however, other types of relays could be used. The key fob 110 automatically transmits an RF response upon receiving the LF challenge. The RF response signal will typically transmit between approximately 20-200 m back to the vehicle 105. If the vehicle 105 receives this response it will assume that the key fob 110 is in the vicinity of the vehicle 105 and so the request will be authenticated. In addition, the relay attack method may also be applied to extend the range of the RF response range beyond the transmit range of the key fob 110.

Figure 3:
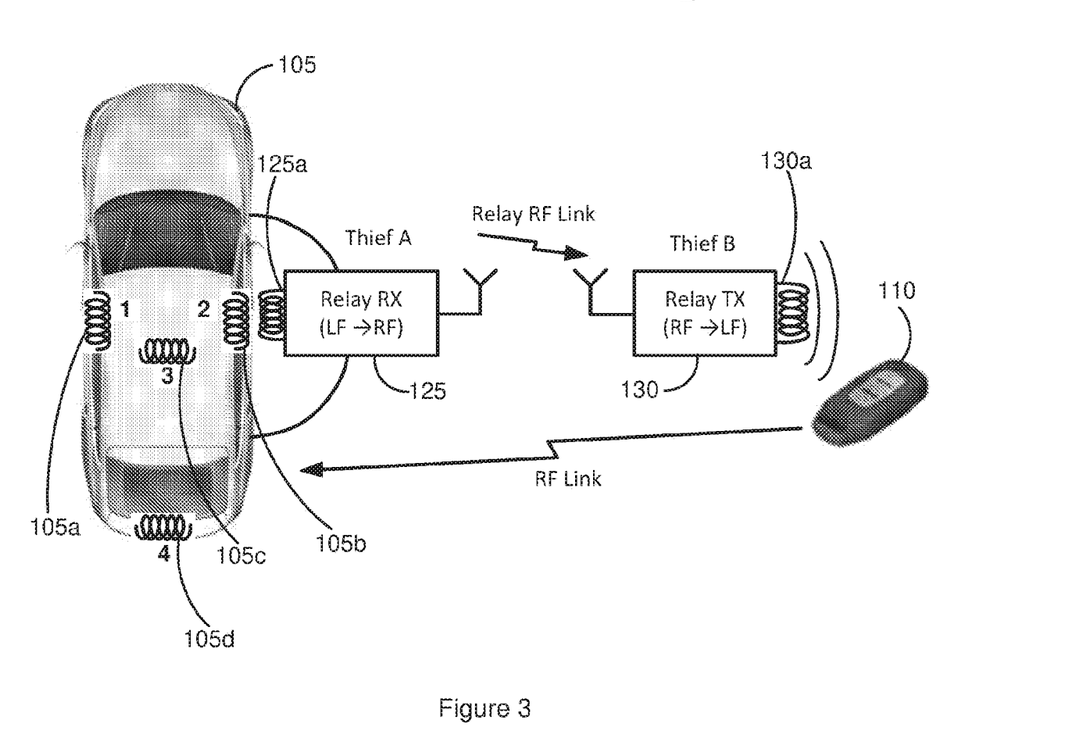
FIG. 3 is a schematic diagram a relay attack on a vehicle having a PEPS system with the vehicle LF antenna orientations displayed.

FIG. 3 illustrates a relay attack on a vehicle and the vehicle LF antenna orientations. The relay attack in FIG. 2 and FIG. 3 is known as a one dimensional (1D) relay where each relay 125 and 130 used by the thieves includes a single LF antenna 125a and 130a respectively. The vehicle 105 typically has several antennas mounted in two possible orientations in relation to each other i.e. parallel or orthogonal to each other. As shown in FIG. 3, typical antenna orientations for a vehicle 105 may be for example antenna 105a, 105b parallel to each other and located in the door handles while antenna 105c, 105d are parallel to each other and are located in the cabin and trunk of the vehicle respectively (although it will be appreciated that there may be more antennas and antenna orientations provided). In operation, a relay 125 needs two antennas mounted orthogonally to each other in order to maintain this relationship. In practice, the simplest relay attack will involve a relay receiver 125 having antennas 125a and relay transmitter 130 having antenna 130a to replicate the antennas at the vehicle 105.

The present invention utilizes a vector check using parallel antennas which are mounted at different locations in the vehicle 105 that are orthogonal to the antenna at the PEPS triggering location. The selection of antennas orthogonal to the antenna at the PEPS triggering location may be utilized because they are likely to couple low magnetic field levels into a relay. However, it is also possible to select other antenna orientations. For example, selecting two or more antennas associated with the vehicle such when a one dimensional relay is used the RSSI levels for the selected antennas measured by the key fob at the relay transmitter location occur in a 'noise floor' portion of an RSSI vs magnetic field curve associated with the 3D LF receiver. These antennas should be determined experimentally, i.e., inserting a relay between the vehicle and the key fob as demonstrated in FIG. 2 and FIG. 3.

The present invention relies on the key fob using a 3D LF receiver (using discrete LF antennas or one 3D LF antenna) to determine the LF signal level on the x, y and z-axes. PEPS key fobs typically have a 3D LF receiver in order for the vector sum of the magnetic field strength to be the same regardless of the key fob rotation.

Figure 4:
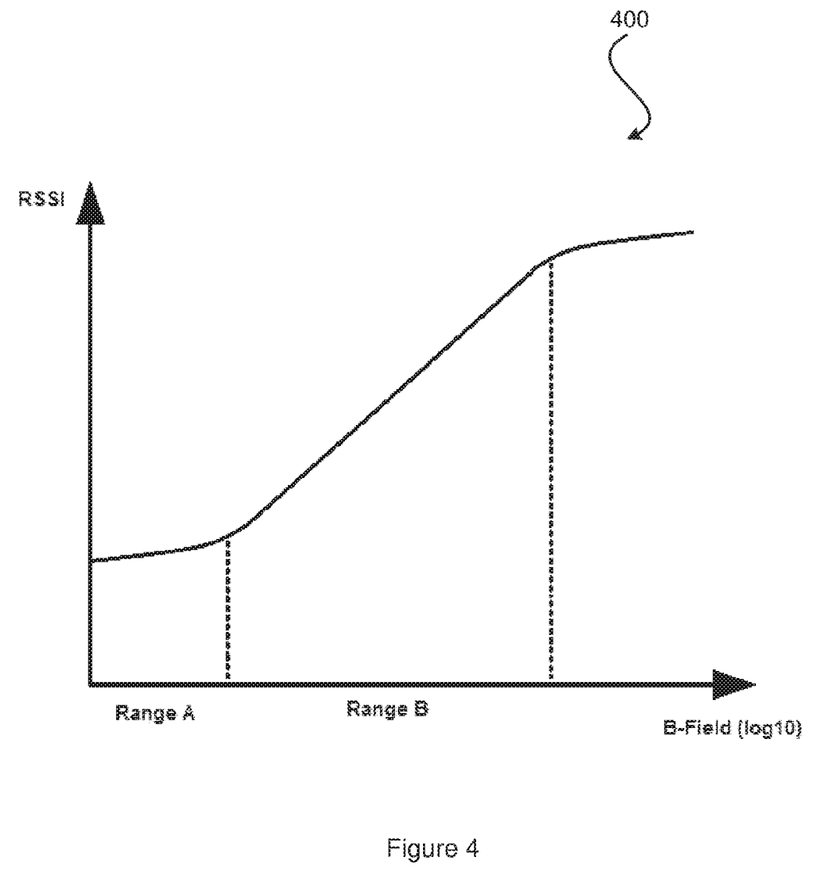
FIG. 4 is a chart illustrating RSSI versus magnetic field.

FIG. 4 is a chart 400 of RSSI values to magnetic field. A problem with comparing perpendicular antennas (as known in the prior art) is that it does not work as expected and in particular this method is limited by the dynamic range of the RSSI measurement. For example, where a vector check is performed using two perpendicular antennas (e.g. antenna 105b and 105c from FIG. 3) when a relay is positioned in the vehicles right hand entry zone (i.e. proximal to antenna 105b), the antenna 105b RSSI measurement will typically occur in the linear part of the RSSI measurement curve. This is shown as Range B in FIG. 4. The Range B part of the curve 400 is defined as the "linear" part of the curve because the input RSSI values correspond to the correct magnetic field levels (as defined by the equation used to convert the measured RSSI value to a magnetic field value). However, antenna 105c of FIG. 3 will have an RSSI measurement level which will typically occur in the "noise floor" part of the curve 400 (denoted Range A). At this point of the curve 400 the equation is no longer valid. Since the RSSI measurements occur in different parts of the RSSI curve, the normalized x, y and z components are different between the two perpendicular antennas, and so the relay will not be detected.

In contrast, the present invention utilizes a vector check using parallel antennas which are mounted at different locations in the vehicle 105. The vehicle antennas must be driven sequentially. Depending on the antenna positioning in the vehicle 105 the x, y and z components measured by the key fob 110 will differ when the key fob is located at the vehicle 105. In addition, when the x, y and z components are normalized, the x, y and z ratios are also different between the two parallel antennas. The parallel antennas may be, for example 105c and 105d as shown in FIG. 3. This means that the RSSI values will occur in Range B of the RSSI measurement curve 400 shown in FIG. 4.

Figure 5:
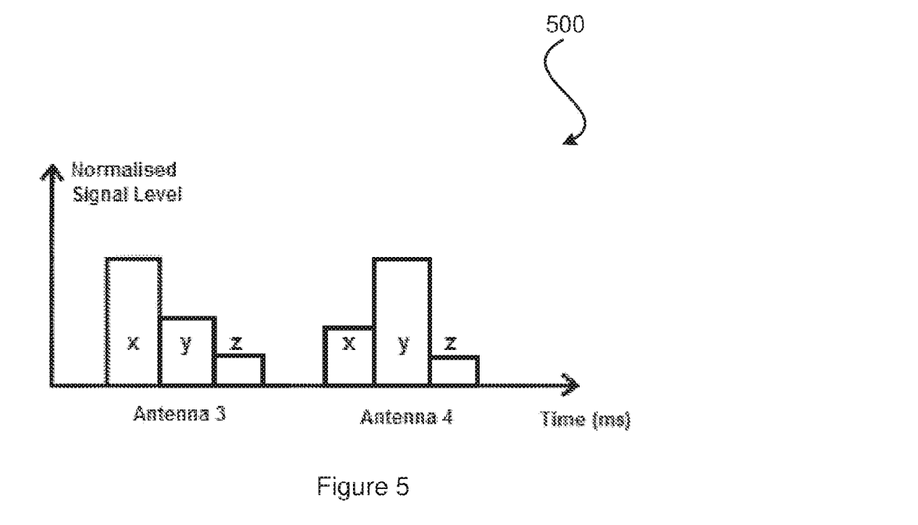
FIG. 5 illustrates normalized x, y and z components measured by a key fob from parallel vehicle antennas when measured within the PEPS operating regions at the vehicle in accordance with an embodiment of the present invention.

FIG. 5 is a chart 500 illustrating an example of the normalized signal levels of parallel antennas 105c and 105d of FIG. 3 when measured in the PEPS operating regions at the vehicle 105. The key fob 110 measures the x, y and z components from the two antennas 105c, 105d, this ensures that the antenna at the PEPS triggering location is not used in the vector check and that the two antennas used are perpendicular to the antenna at the triggering location. For example, for the vehicle 105 shown in FIG. 3 when a triggering event occurs on the right hand side of the vehicle, i.e. near the side where antenna 105b is located, it is critical that antenna 105b is not used in the vector check. The two antennas perpendicular to antenna 105b (but parallel to each other) must be used, i.e. antennas 105c and 105d.

The x, y and z ratio is determined for the selected antennas, in this case, 105c and 105d. At the vehicle 105, where no relay is present, the normalized x, y and z ratio is between the two parallel antennas 105c and 105d are different as can be seen in FIG. 5.

As an example, if we consider the case where the RSSI level is measured by the key fob 110 from antenna 105c for x, y and z results in magnetic field levels of 100 nT, 50 nT and 20 nT respectively. Then the normalized values for x, y and z are found by dividing the magnetic field value from x, y and z by the maximum value from x, y and z. In this example, the maximum value is 100 nT, so that normalized values for x, y and z are 100 nT/100 nT=1, 50 nT/100 nT=0.5 and 20 nT/100 nT=0.2, so values of 1 (100%), 0.5 (50%) and 0.2 (20%).

Further, when the RSSI levels measured by the key fob from antenna 105d for x, y and z result in magnetic field levels of 20 nT, 50 nT and 10 nT respectively, then the normalized values for x, y and z are 0.4 (40%), 1 (100%) and 0.2 (20%) as shown in FIG. 5. In this case the normalized x, y and z values for antennas 105c and 105d are shown in FIG. 5. For this example we can assume that the range of the normalized values from the antennas due to system inaccuracies is 10% (the required range may be determined experimentally to avoid false relay detections at the vehicle without compromising on the methods capability to detect a relay). The difference in the normalized x values from antenna 105c (100%) and antenna 105d (40%) is 60%; the difference in the normalized y values from antenna 105c (50%) and antenna 105d (100%) is 50%; and the difference in the normalized Z values from antenna 105c (20%) and antenna 105d (20%) is 0%. Given that not all the normalized x, y and z values for antennas 105c and 105d are within the predefined 10% it can be concluded that a relay attack has not occurred.

When a 1D relay attack is performed, Thief A associated with relay 125 as shown in FIG. 3 will typically position the pickup antenna to be parallel to one of the external antennas, for example the door handle antenna 105b. The reason that this occurs is that the thief is wanting to couple as much of the signal as possible into the relay receiver 125. Since the other vehicle antennas 105a, 105c and 105d are physically distant to the door handle antenna 105b the amount of signal coupled into the relay 125 from these antennas is low (the magnetic field is proportional to $1/distance^3$). When the key fob 110 is positioned at the relay transmitter 130 (Thief B) the vector components of the two selected vehicle antennas (105c and 105d) are very low since these antennas are perpendicular to the vehicle antenna closest to the relay pick up 125. If a comparison of vector components from two parallel antennas is made (especially if these antennas are perpendicular to the vehicle antenna parallel to the relay pick up antenna, i.e. the door handle antenna 105b) then the x, y and z ratios between the two parallel antennas are no longer different but within a very closely defined range because the one dimensional relay has only one transmit antenna. It will be appreciated that data relating to the antennas and ranges can be stored and collected by a controller associated with the system and vehicle 105.

Figure 6:
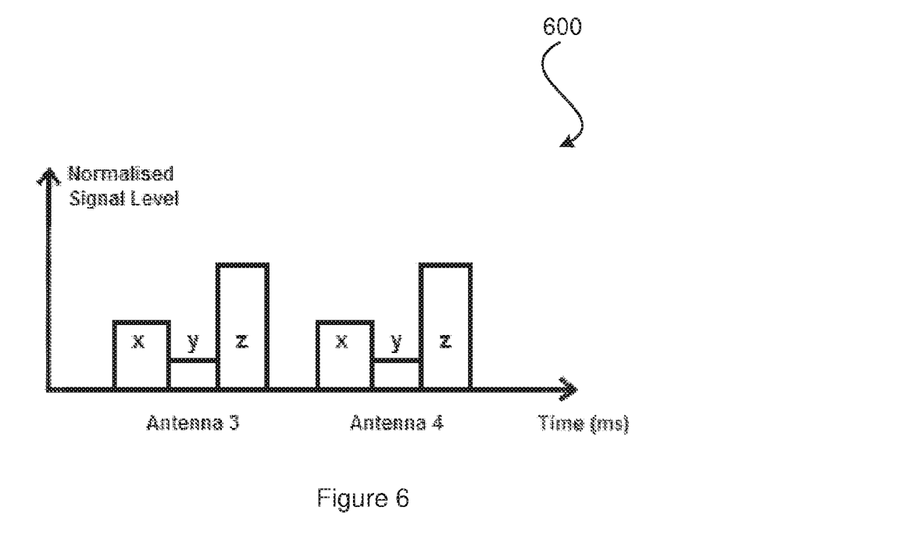
FIG. 6 illustrates normalized x, y and z components measured by a key fob from parallel vehicle antennas when measured at the relay transmitter location in accordance with an embodiment of the present invention.

When a 1D relay is used, the RSSI values generated by the two parallel antennas (that are orthogonal to the antenna at the PEPS triggering location) will occur in Range A as shown in FIG. 4 of the RSSI measurement curve 400. The normalized x, y and z values will be within a closely defined range, for example, 0.53 (53%), 0.18 (18%) and 1 (100%) for antenna 105c and 0.49 (49%), 0.21 (21%) and 1 (100%) for antenna 105d as shown in FIG. 6.

For this example we can assume that the range of the normalized values from the antennas due to system inaccuracies is 10% (the required range may be determined experimentally to avoid false relay detections at the vehicle without compromising on the methods capability to detect a relay). The difference in the normalized x values from antenna 105c (53%) and antenna 105d (49%) is 4%; the difference in the normalized y values from antenna 105c (18%) and antenna 105d (21%) is 3%; and the difference in the normalized Z values from antenna 105c (100%) and antenna 105d (100%) is 0%. Given that all the normalized x, y and z values for antennas 105c and 105d are within the predefined 10% it can be concluded that a relay attack has occurred.

These are simply example values, but if it is determined that the ratios are not within the predetermined range for x, y and z then the PEPS process is continued and if not it is concluded that a relay attack has occurred.

Figure 7:
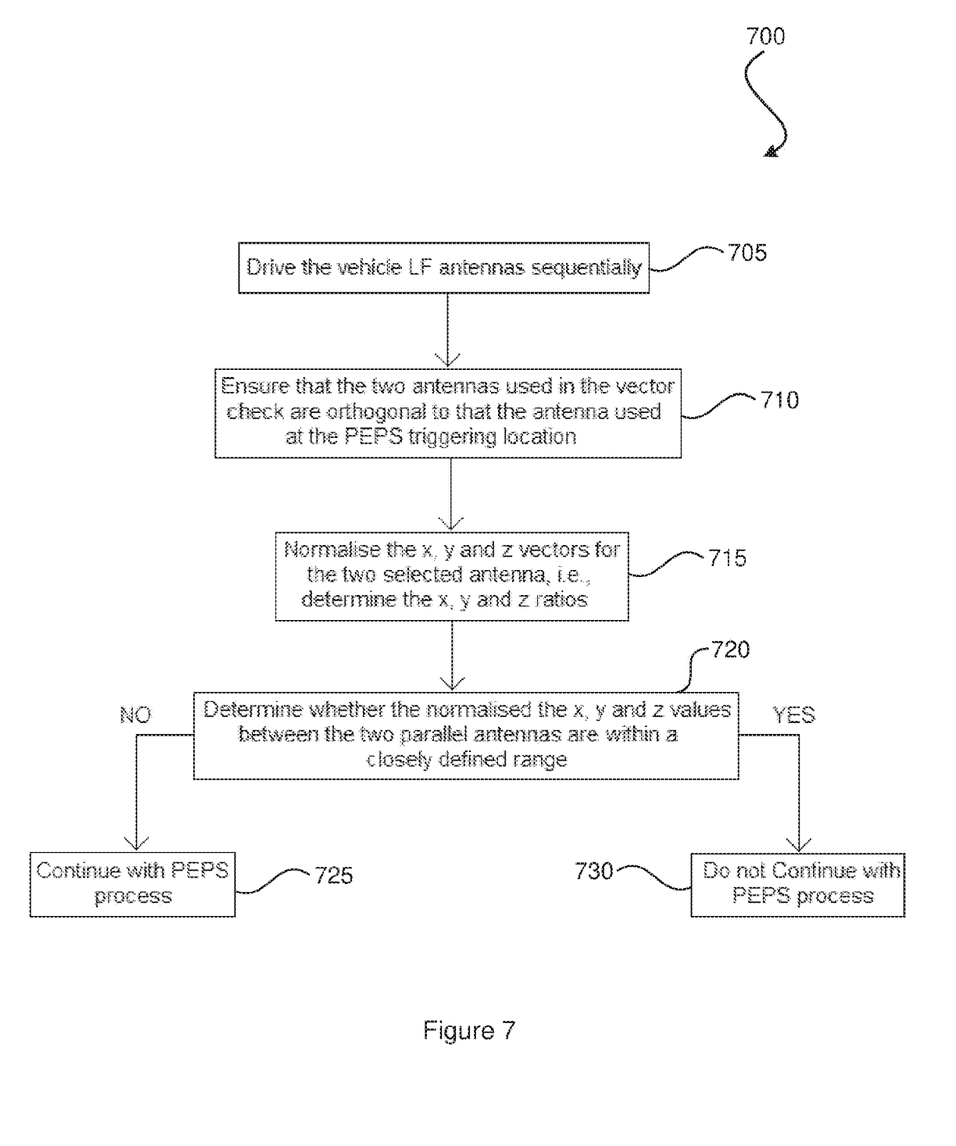
FIG. 7 is a flow diagram illustrating the method of the present invention to prevent a relay attack on the vehicle having a PEPS system.

In operation, as shown in FIG. 7 the method 700 includes driving the vehicle antennas sequentially at step 705. At step 710 its determined that that the antenna at the PEPS triggering location is not used in the vector check and that the two parallel antennas used are perpendicular to the antenna at the triggering location.

Control then moves to step 715, in which the x, y and z vectors are normalized for the two selected antennas.

At step 720 it is determined whether or not the normalized x, y and z values between the two parallel antennas are within a closely defined range. In the event that they are not within the closely defined range control moves to step 725 where the PEPS process is continued since it is determined that a relay attack is not present otherwise, control moves to step 730 where it is determined that a relay attack has occurred and the PEPS process is not continued.

The invention claimed is:

1. A method of detecting if a relay is present in a passive entry passive start (PEPS) system for a vehicle, the method comprising:
   (a) transmitting low frequency (LF) signals from antennas associated with a vehicle to a key fob using a three dimensional (3D) LF receiver to measure the LF signal level on the x, y and z-axes;
   (b) selecting two or more parallel antennas associated with the vehicle that are orthogonal to the antenna at the PEPS triggering location;
   (c) normalizing the x, y and z vectors that are measured by the key fob for the selected two or more parallel antennas associated with the vehicle;
   (d) determining if the normalized x, y and z vectors for the selected two or more parallel antennas associated with the vehicle are within a predefined range;
   wherein the LF challenge signal contains a data telegram and sequentially transmitted continuous wave (CW) signals from the vehicle antennas transmitted sequentially.

2. The method of claim 1, wherein the predefined range determined experimentally to avoid false relay detections at the vehicle without compromising on the capability to detect a relay.

3. The method of claim 1, wherein the signal is transmitted as a low frequency LF signal.

4. A method of detecting if a relay is present in a passive entry passive start (PEPS) system for a vehicle, the method comprising:
   (a) transmitting low frequency (LF) signals from antennas associated with a vehicle to a key fob using a three dimensional (3D) LF receiver to measure the LF signal level on the x, y and z-axes;
   (b) selecting two or more antennas associated with the vehicle such that when a one dimensional relay is used the RSSI levels measured for the selected antennas by the key fob at the relay transmitter location occur in a 'noise floor' portion of an RSSI vs magnetic field curve associated with the 3D LF receiver;
   (c) normalizing the x, y and z vectors that are measured by the key fob for the selected antennas associated with the vehicle; and (d) determining if the normalized x, y and z vectors for the selected antennas associated with the vehicle are within a predefined range;

wherein the LF challenge signal contains a data telegram and sequentially transmitted continuous wave (CW) signals from the vehicle antennas transmitted sequentially.

5. A system for detecting if a relay is present in a passive entry passive start (PEPS) system for a vehicle, comprising:

antennas associated with the vehicle;

a key fob using a three dimensional (3D) low frequency (LF) receiver to measure the LF signal level on the x, y and z-axes; and one or more controllers configured to perform the following:

(a) transmit LF signals from the antennas associated with the vehicle to be measured by the key fob using a 3D LF receiver;

(b) select two or more parallel antennas associated with the vehicle that are orthogonal to the antenna at a PEPS triggering location;

(c) normalize the x, y and z vectors that are measured by the key fob for the selected two or more parallel antennas associated with the vehicle; and (d) determine if the normalized x, y and z vectors for the selected two or more parallel antennas associated with the vehicle are within a predefined range;

wherein the LF challenge signal contains a data telegram and sequentially transmitted continuous wave (CW) signals from the vehicle antennas transmitted sequentially.

6. The system of claim 5, wherein the controller is located in the vehicle.

7. The system of claim 5, wherein one of the controllers is located in both the vehicle and one of the controllers is located in the key fob.

8. A system for detecting if a relay is present in a passive entry passive start (PEPS) system for a vehicle, comprising:

antennas associated with the vehicle;

a key fob using a three dimensional (3D) low frequency (LF) receiver to measure the LF signal level on the x, y and z-axes; and one or more controllers configured to perform the following:

(a) transmit LF signals from the antennas associated with the vehicle to be measured by the key fob having using a three dimensional 3D LF receiver;

(b) select two or more antennas associated with the vehicle such when a one dimensional relay is used the RSSI levels measured for the selected antennas by the key fob at the relay transmitter location occur in a 'noise floor' portion of an RSSI vs magnetic field curve associated with the 3D LF receiver;

(c) normalize the x, y and z vectors that are measured by the key fob for the selected antennas associated with the vehicle; and (d) determine if the normalized x, y and z vectors for the selected antennas associated with the vehicle are within a predefined range;

wherein the LF challenge signal contains a data telegram and sequentially transmitted continuous wave (CW) signals from the vehicle antennas transmitted sequentially.

\* \* \* \* \*